(12) United States Patent
Benett et al.

(10) Patent No.: US 7,601,286 B2
(45) Date of Patent: Oct. 13, 2009

(54) POLYMER-BASED PLATFORM FOR MICROFLUIDIC SYSTEMS

(75) Inventors: William Benett, Livermore, CA (US); Peter Krulevitch, Pleasanton, CA (US); Mariam Maghribi, Livermore, CA (US); Julie Hamilton, Tracy, CA (US); Klint Rose, Boston, MA (US); Amy W. Wang, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1455 days.

(21) Appl. No.: 10/107,933

(22) Filed: Mar. 26, 2002

(65) Prior Publication Data

US 2002/0134907 A1    Sep. 26, 2002

Related U.S. Application Data

(60) Provisional application No. 60/278,864, filed on Mar. 26, 2001.

(51) Int. Cl.
*B29C 33/76* (2006.01)

(52) U.S. Cl. ...................... 264/221; 264/317

(58) Field of Classification Search ................. 264/334, 264/317, 221
See application file for complete search history.

(56) References Cited

U.S. PATENT DOCUMENTS

| | | | | |
|---|---|---|---|---|
| 3,974,872 A | * | 8/1976 | Buhrer | 164/40 |
| 5,256,360 A | * | 10/1993 | Li | 264/219 |
| 5,304,487 A | | 4/1994 | Wilding et al. | |
| 5,932,315 A | | 8/1999 | Lum et al. | |
| 6,331,266 B1 | | 12/2001 | Powell et al. | |
| 6,334,856 B1 | * | 1/2002 | Allen et al. | 604/191 |
| 6,393,913 B1 | * | 5/2002 | Dyck et al. | 73/504.12 |
| 6,511,463 B1 | * | 1/2003 | Wood et al. | 604/272 |
| 6,561,208 B1 | * | 5/2003 | O'Connor et al. | 137/15.18 |
| 6,818,395 B1 | * | 11/2004 | Quake et al. | 435/6 |
| 2004/0028875 A1 | * | 2/2004 | Van Rijn et al. | 428/98 |

FOREIGN PATENT DOCUMENTS

WO    WO 98/45693 A1    10/1998
WO    WO 01/89787 A1    11/2001

* cited by examiner

*Primary Examiner*—Monica A Huson
(74) *Attorney, Agent, or Firm*—James S. Tak; John J. Lee

(57) ABSTRACT

A method of forming a polymer-based microfluidic system platform using network building blocks selected from a set of interconnectable network building blocks, such as wire, pins, blocks, and interconnects. The selected building blocks are interconnectably assembled and fixedly positioned in precise positions in a mold cavity of a mold frame to construct a three-dimensional model construction of a microfluidic flow path network preferably having meso-scale dimensions. A hardenable liquid, such as poly (dimethylsiloxane) is then introduced into the mold cavity and hardened to form a platform structure as well as to mold the microfluidic flow path network having channels, reservoirs and ports. Pre-fabricated elbows, T's and other joints are used to interconnect various building block elements together. After hardening the liquid the building blocks are removed from the platform structure to make available the channels, cavities and ports within the platform structure. Microdevices may be embedded within the cast polymer-based platform, or bonded to the platform structure subsequent to molding, to create an integrated microfluidic system. In this manner, the new microfluidic platform is versatile and capable of quickly generating prototype systems, and could easily be adapted to a manufacturing setting.

33 Claims, 7 Drawing Sheets

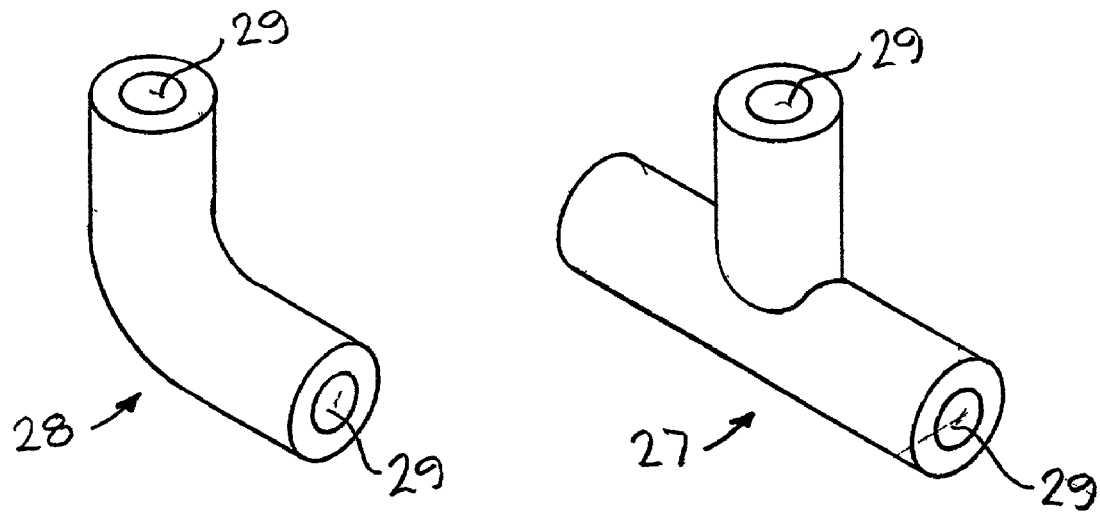
FIG. 6A  FIG. 6B
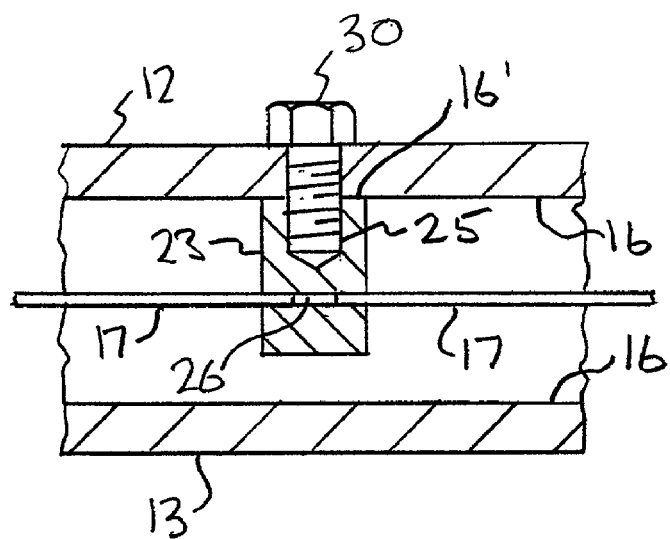
FIG. 7

POLYMER-BASED PLATFORM FOR MICROFLUIDIC SYSTEMS

RELATED APPLICATION

This application claims priority in provisional application filed on Mar. 26, 2001, entitled "Polymer-Based Platform for Microfluidic Systems" serial No. 60/278,864, by inventor(s) William J. Benett, Peter Krulevitch, Mariam N. Maghribi, Julie Hamilton, Klint A. Rose, and Amy W. Wang.

The United States Government has rights in this invention pursuant to Contract No. W-7405-ENG-46 between the United States Department of Energy and the University of California for the operation of Lawrence Livermore National Laboratory.

FIELD OF THE INVENTION

The present invention relates to microfluidic systems and methods for fabricating such systems. More particularly, the present invention relates to a polymer-based microfluidic system platform, and a method and system for forming the platform capable of integrating of various microdevices together with microfluidic circuits in a single compact unit.

BACKGROUND OF THE INVENTION

There is a growing need to develop portable instrumentation for field-based detection and analysis of chemical or biological warfare agents, as well as for medical diagnostics, drug discovery, chemical synthesis, and environmental and industrial monitoring applications. Microfluidic systems incorporating micromachined devices play a key role in these new instruments, combining sample collection, preparation, and analysis all in a compact package, as well as enabling automated operation. More than just miniaturized versions of larger components manufactured using traditional methods, these fluidic devices and systems exploit unique physical phenomena and advantageous scaling laws which occur at the micro-scale, such as laminar flow and surface tension effects.

Producing truly integrated microfluidic systems, however, has proven to be a challenge in the past because many of the system components are made from different, incompatible materials, or are too complex to integrate on a single substrate. And while a great deal of work has focused on the fabrication and function of microdevices, such as micropumps, valves, etc., comparatively little has been developed in the packaging of microfluidic systems for the combined operation of such microdevices. The integration of different devices into single compact units thus presents one of the key challenges existing today to realizing robust microfluidic systems which provide highly efficient interfacing between devices or with the external environment.

It would therefore be advantageous to have a platform construction using a simple yet effective packaging process and system which enables integration of multiple microfluidic components, such as valves, pumps, filters, reservoirs, mixers, separators, power sources, connectors, electronics, optical elements (e.g. optical fibers, lasers, LEDs, other light sources, filters, and lenses) and sensors, along with microfluidic circuits into single compact units. The platform, system and technique should be flexible enough to address the unique packaging requirements in forming prototype microfluidic systems, but which is also cost-effective to easily adapt to mass production. To this end, the use of pre-fabricated building blocks for assembling the variably complex network configurations would enable rapid prototyping of microfluidic circuits in a wide range of possible configurations.

SUMMARY OF THE INVENTION

One aspect of the invention includes a method of forming a microfluidic system platform comprising the steps of: providing a mold frame having frame walls surrounding a mold cavity; providing a set of mold forms for use in molding hollow microfluidic features, the set of mold forms comprising elongated mold forms for use in molding microfluidic channels, and block mold forms for use in molding microfluidic cavities; constructing a three-dimensional model construction of a microfluidic flow path network in the mold cavity by interconnecting mold forms selected from the set of mold forms and suspending the model construction in the mold cavity via the frame walls; introducing a hardenable liquid into the mold cavity to immerse the model construction thereby; hardening the liquid to form (1) a platform structure having a shape of the mold cavity and (2) the microfluidic flow path network in the platform structure having a seamless shape of the model construction and including at least two access ports for enabling fluidic communication with the formed microfluidic flow path network; and removing the model construction from the platform structure through the at least two access ports so as to avail the formed microfluidic flow path network. Preferably, the hardenable liquid is a polymeric material, such as an elastomeric silicone polymer such as poly (dimethylsiloxane).

Another aspect of the present invention includes a method of forming an integrated microfluidic system comprising the steps of: providing a mold frame having frame walls surrounding a mold cavity; providing a set of mold forms for use in molding hollow microfluidic features, the set of mold forms comprising elongated mold forms for use in molding microfluidic channels, and block mold forms for use in molding microfluidic cavities; constructing a three-dimensional model construction of a microfluidic flow path network in the mold cavity by interconnecting mold forms selected from the set of mold forms and suspending the model construction in the mold cavity via the frame walls; introducing a hardenable liquid into the mold cavity to immerse the model construction thereby; hardening the liquid to form (1) a platform structure having a shape of the mold cavity and (2) the microfluidic flow path network in the platform structure having a seamless shape of the model construction and including at least two access ports for enabling fluidic communication with the formed microfluidic flow path network; removing the model construction from the platform structure through the at least two access ports so as to avail the formed microfluidic flow path network; and connecting a pre-formed microdevice to the platform structure so that fluidic communication is established with the formed microfluidic flow path network via at least one of the at least two access ports of the platform structure.

Still another aspect of the present invention is a system for mold-forming a microfluidic system platform, the system comprising: a mold frame having frame walls surrounding a mold cavity; a set of interconnectable mold forms for use in molding hollow microfluidic features, the set of mold forms comprising elongated mold forms for use in molding microfluidic channels, and block mold forms for use in molding microfluidic cavities; and a three-dimensional model construction of a microfluidic flow path network suspended in the mold cavity via the frame walls and comprising releasably interconnected mold forms selected from the set of interconnectable mold forms, wherein, upon introducing and hardening a hardenable liquid in the mold cavity, a platform structure may be mold-formed having a shape of the mold cavity, and the microfluidic flow path network may be mold-formed in the platform structure having a shape of the model construction and having at least two access ports through which the model construction may be removed.

Another aspect of the present invention is a microfluidic system platform comprising: a molded structure having a seamless three-dimensional microfluidic flow path network molded therein, the microfluidic flow path network including at least two molded access ports for enabling fluidic communication with the microfluidic flow path network.

And another aspect of the present invention is an integrated microfluidic system comprising: a molded structure having a seamless three-dimensional microfluidic flow path network molded therein, the microfluidic flow path network including at least two molded access ports for enabling fluidic communication with the microfluidic flow path network; and at least one pre-formed microdevice externally connected to the molded structure to establish fluidic communication with the microfluidic flow path network through at least one of the access ports.

One advantage of the microfluidic system platform of the present invention is that it can integrate many functions into one system, including pumping, mixing, diluting, separating, filtering, sensing, etc. In this way, sample processing and analysis can be performed on just one chip/module, which were formerly performed as separate functions on different modules so that the analysis took much more time. This significantly overcomes the difficulty of connecting multiple components and feeding a sample fluid efficiently from component to component. Additionally, further advantages of the present invention's hybrid method to integrating microdevices into systems include: incorporates and uses optimized custom and off-the-shelf components; improves device yields; facilitates maintenance; and makes it possible to isolate disposables from more expensive, reusable system components, thus reducing operations costs. The present invention also enables rapid prototyping and/or commercial mass-production. These advantages of the present invention add value to the general advantages of miniaturization and integration, such as reduction in the use of expensive chemical reagents to a minimum, minimal test sample volume requirements, and ability to maintain system calibration and produce a constant flow of accurate measuring-data without being affected by external influences such as temperature or aging. In this way, hand-held or palm-top chemical/biological laboratories can be built for portability.

BRIEF DESCRIPTION OF THE DRAWINGS

The accompanying drawings, which are incorporated into and form a part of the disclosure, are as follows:

FIG. 6 is a perspective view of two exemplary interconnect mold forms having T and L-shape configurations.

FIG. 7 is a cross-sectional view of an exemplary mounting and interconnection of a mold form in the mold cavity.

DETAILED DESCRIPTION

Figure 1:
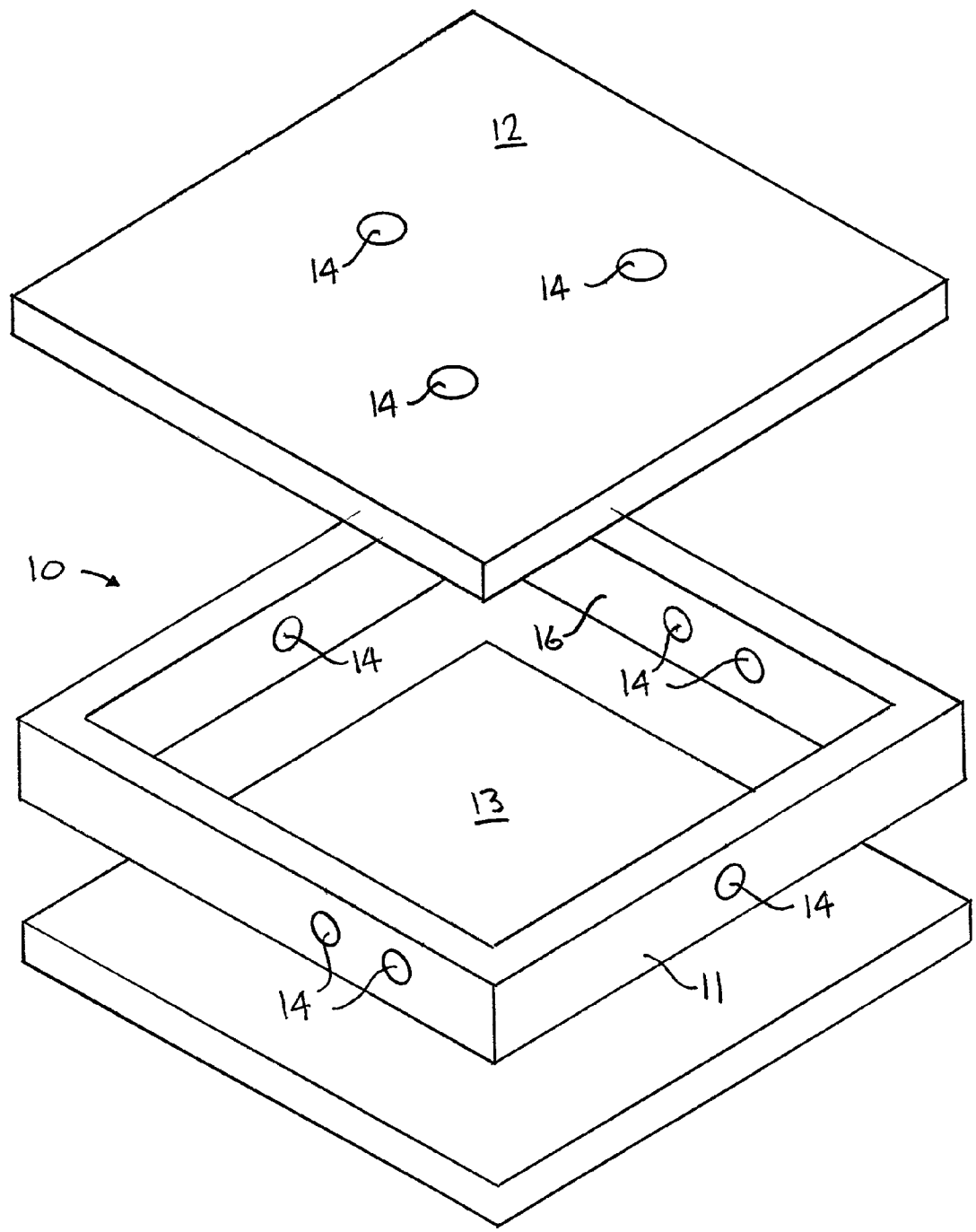
FIG. 1 is an exploded view of an exemplary mold frame of the present invention.

The present invention is directed to methods of forming polymer-based microfluidic system platform structures and integrated microfluidic systems utilizing such platform structures. As used herein and in the claims, the term "microfluidic system," as well as "microfluidic network" and "microfluidic flow path network," generally refer to both micro-scale fluidic systems (micron range dimensions), and meso-scale fluidic systems (greater than micron range dimensions). It is appreciated that in both micro- and meso-scales, fluid volumes transferred through microfluidic systems are typically in the order of microliters to milliliters. Furthermore, meso-scale is understood to be the intermediate level between macro and micro-scales. Thus meso-scale features serve as an interface between macro and micro mediums to enable direct exchange and interaction with a user, e.g. receiving fluid samples via pipette.

The polymer-based microfluidic system platform of the present invention serves two main functions: (1) as an integrated platform for incorporating and packaging microdevices and components, such as commercially-available micro-pumps and valves, sensors, mixers, separators, glass and silicon microfluidic chips, PC boards and electronics including integrated circuit chips, and optical elements (e.g. optical fibers, lasers, LEDs, other light sources, filters, and lenses), along with microfluidic circuits (e.g. flow channels and reservoirs) into a single compact unit, and (2) as an interface between macro and micro-scale mediums to provide integrally formed channels and volumes preferably having meso-scale dimensions for handling relatively large volumes of test sample fluid for subsequent channeling into smaller micro-scale processing and analyzing regions and/or components. In regards to the integration function, it is notable that the method of the present invention serves to hybrid integrate various microdevices without compromising functionality of any of the microdevices. In contrast, device functionality is often compromised in monolithically integrated microfluidic systems. Hybrid integration strategies such as that of the present invention are more flexible and allow for optimization and testing of the various components before integration.

Additionally, the method and system of the present invention enables the rapid prototyping of an essentially infinite number of possible microfluidic circuits and systems. Rapid formation is possible due to the use of pre-fabricated building blocks or mold forms in constructing a model construction representing the desired configuration of microfluidic flow path network. Various microfluidic and electronic chips and other components can also be directly incorporated to the formed platform to produce complete microfluidic systems. Furthermore, rapid formation is possible due to the complete and seamless formation of the entire microfluidic flow path network in a single molding step without the need for further steps, such as the sandwiching of two cavity halves. The method and system of the present invention enables the rapid prototyping fabrication of microfluidic systems having various complexities including various size ranges due to the simple interconnecting assembly of the component building blocks, and provisions for their easy removal from the molded platform structure.

Generally, the microfluidic system platform is mold-formed in a casting process involving a mold frame having a mold cavity, and a model construction assembled in the mold cavity representing a desired configuration of a microfluidic flow path network. The term "microfluidic flow path network" is used herein and in the claims to define a continuous network of hollow cavities and channels formed within a single platform structure and having a seamless shape of the model construction. The model construction is assembled utilizing mold forms selected from a set of pre-formed interconnectable mold forms having various network shapes. Upon introducing and hardening a molding liquid, a platform structure is formed having the microfluidic flow path network mold-formed therein with such hollow network features as microfluidic channels and reservoirs. The resulting platform structure can be completely self-contained, or can interface to external components such as electronics, power sources, and detection instrumentation.

Figure 4:
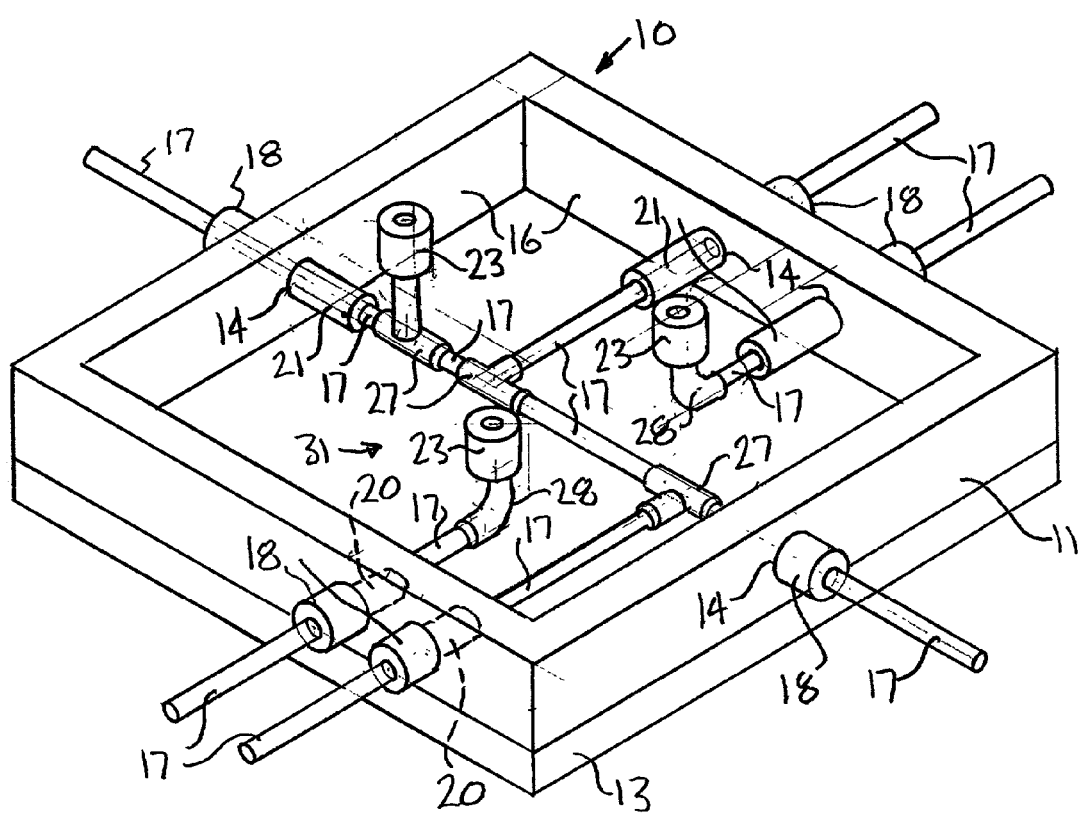
FIG. 4 is a perspective view of a mold frame with the cover plate wall removed, illustrating a model construction of an exemplary microfluidic flow path network.
Figure 5:
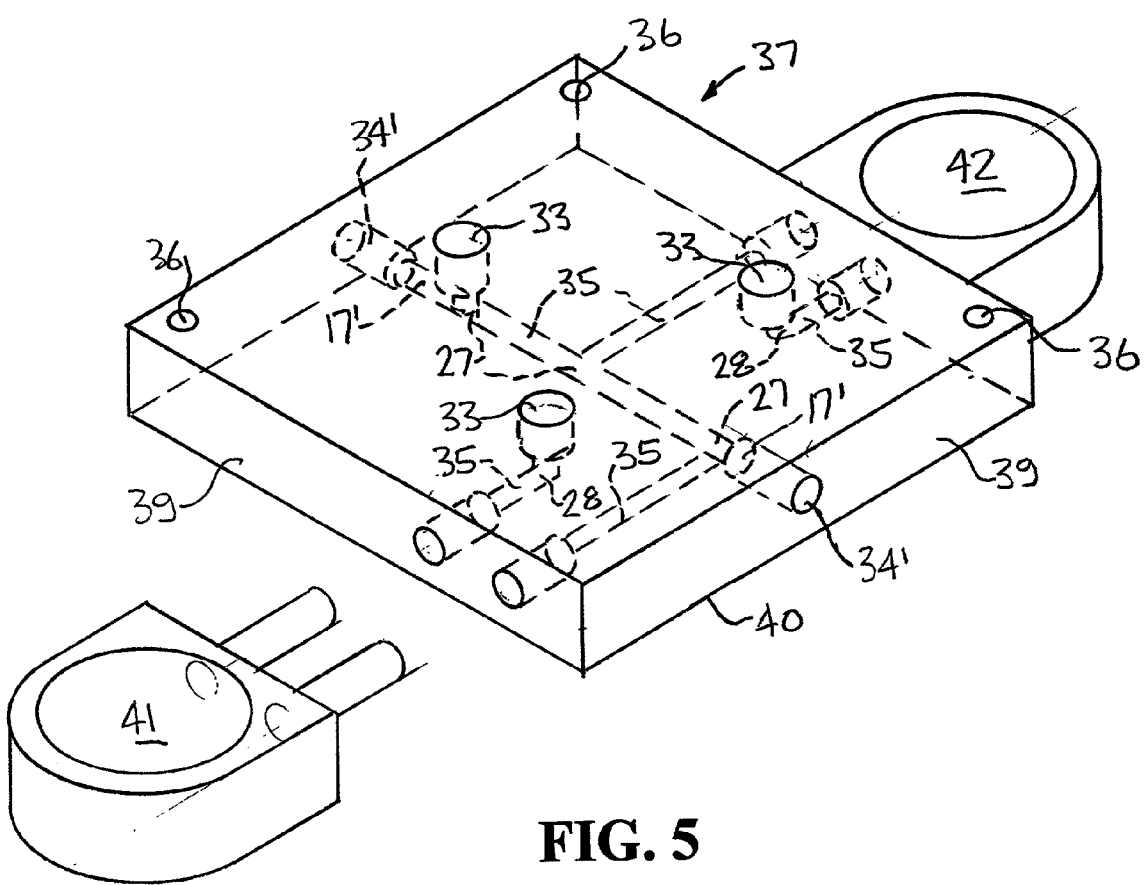
FIG. 5 is a perspective view of an exemplary molded platform structure molded from the model construction of FIG. 4.

Turning now to the drawings, FIGS. 1 and 4 show an exemplary mold frame, generally indicated at reference character 10, used to fabricate a microfluidic system platform, such as the exemplary platform structure 37 in FIG. 5. The mold frame 10 generally has a three-dimensional construction comprising frame walls surrounding a mold cavity (15 in FIG. 4). The frame walls shown in FIG. 1 include sidewalls 11 (four shown), a lower wall or base 13 and an upper wall or cover 12. The shape of the mold cavity 15 is determined by the particular arrangement of the frame walls surrounding the mold cavity 15. It is appreciated that while the mold frame 10 is shown in FIG. 1 as an assembly of three component parts, alternative structures and configurations may be utilized, such as where the base 13 and the sidewalls 11 are integrally joined, with only the cover 12 being removable. In certain embodiments, the mold cavity 15 may be completely enclosed by the frame walls. For such embodiments, two ports (not shown) may be used to fill the mold cavity: a fill port and a vent port. Upon injecting a molding liquid into the fill port, air escapes through the vent port. Preferably the frame walls have throughbores 14 which are bored, mold-formed, or otherwise produced thereon to communicate with the mold cavity 15. The throughbores 14 may be pre-formed in a generic pattern, or custom formed for a pre-determined network configuration. In any event, it is appreciated that the throughbores 14 are not limited to any pattern or location on the frame walls. And the mold frame 10 may be constructed from any rigid material composition, e.g. a polymeric material such as acrylic, which is non-reactive with the types of molding liquids used in the present invention.

Figure 2:
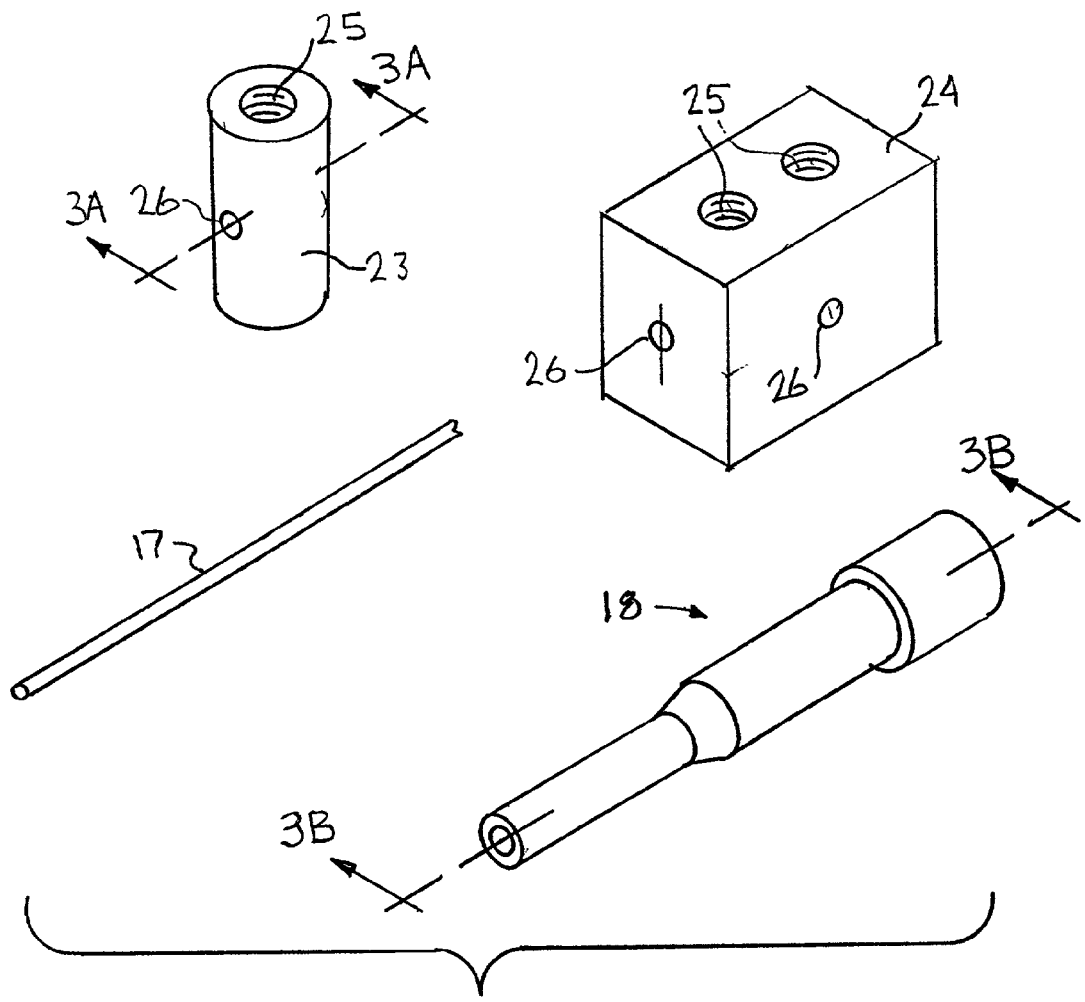
FIG. 2 is a perspective view of four exemplary mold forms used in constructing the model construction of the microfluidic flow path network.

FIG. 2 shows an exemplary set of pre-fabricated building blocks or mold forms for use in constructing a model construction (such as 31 in FIG. 4) outlining and spatially representing a desired microfluidic flow path network (such as 32 in FIG. 5). The set of available mold forms serves to mold hollow microfluidic features having particular shapes, and generally include at least elongated mold forms and block mold forms. The elongated mold forms, e.g. 17 and 18, are for use in molding microfluidic channels, and the block mold forms are for use in molding microfluidic cavities. For example, a wire mold form 17, having an elongated narrow construction, is provided for use in molding a microfluidic channel. It is notable however that other elongated mold forms may be utilized to form microfluidic channels, such as tubing.

Figure 3A:
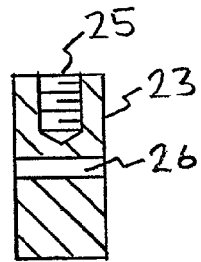
FIG. 3A is a cross-sectional view taken along line 3A of FIG. 2, illustrating the exemplary interconnection feature of a cylindrical mold form.
Figure 3B:
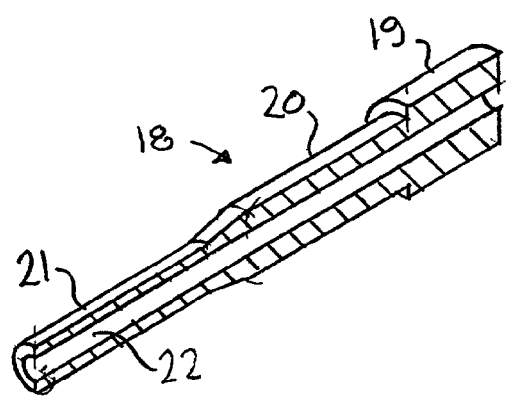
FIG. 3B is a cross-sectional view taken along line 3B of FIG. 2, illustrating the exemplary hollow core of the connector pin mold form.

A connector pin 18 is also provided having a configuration used to position and fixedly secure the wire mold form 17 to the mold frame 10. As shown in FIG. 3B, a cross-sectional view of the connector pin 18 is shown, with the connector pin 18 having a head portion 19, a middle shank portion 20 and a leading end portion 21. Additionally, a hollow core 22 extends through the connector pin 18 from the head to the leading end 21. The hollow core 22 is dimensioned to extend a wire mold form 17 or tubing therethrough in a close-tolerance manner such as to prevent leakage of a molding fluid therebetween. It is notable that plastic tubing has been evidenced to form a better seal with the hollow pin. As shown in FIG. 4, the middle shank portion 20 of the connector pin 18 is dimensioned to be seated in the throughbores 14 of the mold frame 10 also in a close-tolerance manner. The connector pin 18 serves to position and align the wire mold form 17 within the mold cavity 15. It is notable that variations of the connector pin 18 are possible, such at the connector pin 50 shown in FIG. 9 having a leading end with a conical tip to form a seal when pressed to contact a surface. It is also notable that the wire or otherwise elongated mold forms need not be linear; bending of the elongated mold forms to a curvilinear or angular shape can produce molded microchannels having configurations of even greater complexity.

Figure 9:
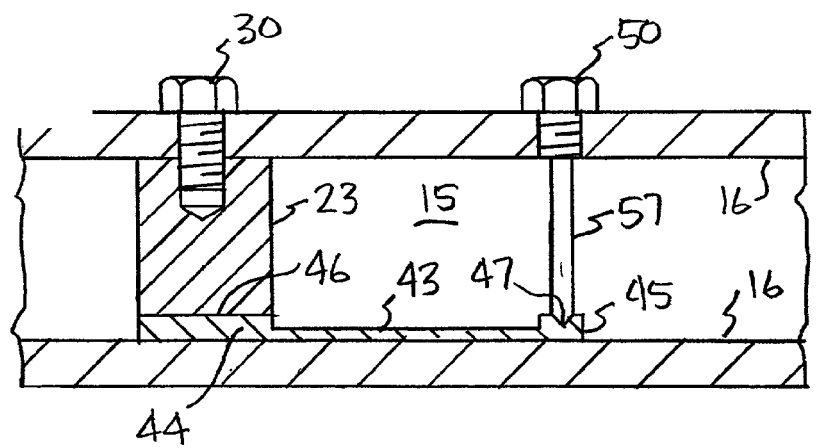
FIG. 9 is a cross-sectional view of an illustrative model construction arrangement in surface-to-surface contact with the micro-scale topographic features of FIG. 8.

Block mold forms also comprise the set of available mold forms, and are used to mold cavities and volumes. In FIG. 2, two illustrative embodiments of the block mold form are provided: a cylindrical block mold form 23, and a rectangular block mold form 24. Each of the block mold forms 23, 24 preferably have a threaded bore or bores 25 used for fixedly mounting and immobilizing the block mold form to the mold frame 10. As shown in FIGS. 7 and 9, mounting screws 30 may be engaged in the threaded bores 25 to secure the block mold form, e.g. 23, in the mold cavity 15. Furthermore, the mounting screws 30 may also serve to produce surface-to-surface contact between a face of the block mold form with an inner surface 16 of the frame walls. The block mold forms may additionally have connector holes 26 for interconnectably seating an end of a wire mold form 17 (see FIG. 7), such that the wire mold form may be removed at a later time. It is appreciated, however, that the interconnection of mold forms may be achieved by other suitable means, such that in any case, continuity is preserved between the later mold-formed hollow features to allow fluidic communication therebetween.

Interconnect mold forms, such as 27, 28 shown in FIG. 6, may additionally be provided in the set of mold forms available for constructing the model construction of a microfluidic flow path network. The interconnect mold forms preferably have a hollow configuration, with connector ports 29 enabling access to the hollow core. For each interconnect mold form, at least two connector ports 29 are provided which are in fluidic communication with each other. In FIG. 6, interconnect mold forms having T and L-shaped configurations are shown, indicated at reference characters 27 and 28, respectively. It is appreciated, however, that other suitable two- or three-dimensional shapes and configurations may be employed to produce complex three-dimensional network configurations. The interconnect mold forms may be fabricated from any suitable rigid or semi-rigid material, such as a polymer, capable of insertably receiving a wire mold form. Preferably, however, the interconnect mold forms are pre-formed from the same material as that used for molding the platform structure. In a preferred embodiment, the material composition is a polymeric material. Moreover, an elastomeric silicone polymer such as poly (dimethylsiloxane), herein after "PDMS," is preferably utilized. In any case, the interconnect mold forms are preferably used in conjunction with the elongated mold forms, such as the wire mold form 17. In particular, the interconnect mold forms are configured to snugly receive the ends of one or more wire mold forms 17 in a manner supporting removal at a later time. It is notable that the interconnect mold forms are preferably not removed from the final structure, instead remaining embedded in the platform structure. In contrast, the connector pins 18 and the block mold forms are in most cases removed, as will be discussed in detail below.

In FIG. 4, an assembled model construction 31 is shown suspended in the mold cavity 15 via the frame walls. The assembly 31 has connector pins 18 insertably positioned in throughbores 14 to thereby position and extend wire mold forms 17 in the mold cavity 15. And interconnect mold forms 27, 28 are further used to interconnect and position the wire mold forms 17 in various directions. Three cylindrical block mold forms 23 are also shown interconnected with wire mold forms 17. While the model construction 31 shown in FIG. 4 is suspended only from the four frame sidewalls 11, it is appreciated that the base wall 13 and opposing cover or top wall (12 in FIG. 1) may also be employed to extend additional mold forms therefrom and into the mold cavity 15. The connector pins 18 are seated in the throughbores 14 such that they may be removed in an outward direction subsequent to molding. Additionally, the wire mold forms 17 extending through the connector pins 18 may also be removed through the throughbores 14. As shown in FIG. 4, the wire mold forms 17 and the cylindrical mold forms 23 are suspended in the mold cavity 15, with only the connector pins 18 contacting the mold frame 10. However, as can be seen in FIG. 7, block mold forms, such as cylindrical mold form 23 may also contact and be directly secured to the frame walls. It is notable that the mounting screw 30 may be used to either push away or draw in the cylindrical mold form 23 into pressing surface-to-surface contact with one of a pair of opposing inner surfaces. A mounting screw 30 is used in FIG. 7 to draw in the cylindrical mold form 23 so as to press an upper surface of the cylindrical mold form into surface-to-surface contact with an upper inner surface 16 of a frame wall. While not shown in the drawings, the assembly of the model construction 31 may additionally include the interconnection of pre-formed microdevices to the model construction 31 within the mold cavity 15 prior to molding. Such pre-mold interconnection of a microdevice serves to embed the microdevice in the resulting molded platform, and, upon removing the model construction from the molded platform, the microdevice is in fluidic communication with the microfluidic flow path network.

In this manner, the model construction 31 is constructed having a configuration associated with and spatially demarcating the microfluidic flow path network 32 shown in broken lines in FIG. 5. The model construction 31 shown in FIGS. 4 and 5 illustrate an exemplary construction of a simple mixing system, where two fluid types are separately deposited into the platform 37 for mixing. It is appreciated, however, that many other assemblies may be constructed for performing different functions for different applications. Common to all model constructions, however, is the creation of a three-dimensional configuration utilizing any number and combination of mold forms. It is appreciated that the three-dimensional configurations which are possible with the present invention include the non-intersecting overlap of two or more orthogonal channels at different levels, i.e. having channels which cross over or under other channels without physical intersection at the points of cross over.

Once the mold construction 31 is constructed and suspended in the mold cavity 15, a hardenable liquid is introduced into the mold cavity 15 to immerse the mold construction 31. The hardenable liquid may be poured into the mold cavity 15 through an open end of an open mold frame, or as discussed previously, injected into an enclosed mold cavity via an inlet port and a vent port (not shown). The hardenable liquid used for molding may comprise essentially any liquid that can be solidified into a solid capable of containing and transporting fluids in a microfluidic flow path network. In a preferred embodiment, the hardenable liquid comprises a polymeric or polymer-containing material, hereinafter "polymeric material". And preferably still, the polymeric material is an elastomeric silicone polymer, such as PDMS. Silicone polymers, for example poly (dimethylsiloxane) or PDMS, are especially preferred because they may be cured with heat, such as by exposure of the polymeric liquid to temperatures of about 65 degrees Celsius to about 75 degrees Celsius for exposure times of about, for example, 1 hour. PDMS is a silicone rubber that can be spun onto a substrate or poured into a mold while in its liquid precursor state. Micron-scale features patterned on the mold may be replicated in the cured PDMS. Additionally, room temperature bonding to silicon, glass, or other PDMS substrates can be achieved simply by oxidizing the surface in an $O_2$ plasma and pressing the two substrates together. These techniques may be employed to create sealed microchannels, which have been previously fabricated for such applications as electro-phoretic separation and cell cytometry.

In any case, the introduction of PDMS or other molding liquid serves to completely immerse the model construction 31, such that all exposed surfaces of the model construction is contacted by the molding liquid. Introduction of the hardenable liquid also serves to fill the mold cavity 15 such that the liquid is molded in the shape of the mold cavity. It is important that the model construction 31 be completely immersed in the liquid such that all exposed surfaces of the model construction are in contact with the liquid. Non-exposed surfaces of the model construction 31, however, are excepted from liquid contact so that access ports, such as 34, 34' in FIG. 5, may be formed allowing entry into the formed microfluidic flow path network. The non-exposed surfaces include those surfaces in contact with the mold frame. As shown in FIG. 7, the contact may be along a surface-to-surface contact area 16' between a block mold form 23 and an inner surface 16 of one of the frame walls. Additionally, non-exposed surfaces also include those surfaces of mold forms, for example the connector pins 18, which are seated in the throughbores 14 of the mold frame 10.

After introducing the hardenable liquid into the mold cavity 15, the liquid is hardened as discussed above to produce a platform structure, such as the platform structure 37 shown in FIG. 5 having a shape of the mold cavity 15. Additionally, hardening the liquid mold-forms the microfluidic flow path network 32 within the platform structure 37, with the microfluidic flow path network 32 having a seamless shape patterned after the model construction. It is appreciated that the seamless shape of the microfluidic flow path network is formed in a single molding step such that the microfluidic flow path network is a unitary whole encased by the monolithic configuration of the platform structure. Furthermore, the microfluidic flow path network 32 includes at least two access ports, each enabling fluidic communication with the microfluidic flow path network from beyond the platform structure. In FIG. 5, six access ports 34, 34' are shown which were formed from the non-exposed contact surfaces between the mold forms and the frame walls. In particular, the access ports 34, 34' in FIG. 5 were formed due to the seating of the connector pins 18 through the throughbores 14 of the mold frame 10 in FIG. 4. It is notable that the seating arrangement of the connector ports 18 in the throughbores 14 serve also to align the formed access ports with throughbores 14, such that some of the mold forms of the model construction may be removed through the throughbore subsequent to final formation.

Next, the model construction 31 is removed from the platform structure 37 to avail the interconnected cavities, channels, ports, etc. of the microfluidic flow path network 32 shown in FIG. 5. Removal of the mold forms is typically by disassembling the mold forms and removing at least some of them through the access ports 34, 34'. It is notable that the removal of block mold forms which are in surface-to-surface contact with an inner surface 16 of the mold frame 10 requires the initial removable of one of the frame walls from the mold frame 10. As can be seen in FIGS. 4 and 5, the removable of mold forms through the access ports 34, 34' may cause inevitable circuit breaches in the platform structure which were necessary for suspending the model construction in the mold cavity. These extra access ports are occluded to enclose the microfluidic system and circuit. As shown in FIG. 5, the hollow channels 17' and the access ports 34' on opposite ends of the platform must be sealably filled. The remaining access ports 34, however, are used to access the microfluidic flow path network. It is notable that removal of the model construction is typically through the throughbores of the mold frame, and therefore prior to removing the molded platform structure from the mold frame. However, it is appreciated that other means for suspending the model construction in the mold cavity may support removal of the platform structure prior to removal of the model construction therefrom. It is also notable that not all mold forms used to construct the model construction is to be removed. Preferably, the interconnect mold forms are left embedded in the platform structure, but both the connector pins 18 and the block mold forms 23 are removed.

The microfluidic system platform, such as 37 in FIG. 5, created in this manner will have a seamless microfluidic flow path network integrally formed within the platform structure. Furthermore, the network will have at least two access ports to enable fluidic communication with the flow path network. At least two access ports is necessary to enable fluidic transport into and out of the formed platform. And due to the suspension of the model construction in the mold cavity, the model construction is completely encased by the hardened liquid after molding. Thus, the fluid flow path network will have a seamless configuration with at least one channel having a closed cross-section encased by the molded platform structure.

Subsequent to the removal of the model construction from the molded platform structure 37, a microdevice may be further integrated with the platform structure 37 to produce a hybrid integrated microfluidic system for combined operation in a single compact unit. The term "microdevice", is used herein and in the claims as a pre-formed discrete device or component for performing a specific function in a microsystem, with many of the microdevices being commercially available. Thus, the term "microdevice" includes but is not limited to valves, pumps, filters, reservoirs, mixers, separators, power sources, connectors, electronics, optical elements (e.g. optical fibers, lasers, LEDs, other light sources, filters, and lenses) and sensors. It is also notable that microdevices comprise fluidic devices, such as micropumps and valves, as well as non-fluidic devices, such as optical or electrical devices (e.g. optical fibers, detectors, filters, integrated circuits, etc.) And the term "hybrid integration" is used herein to define the combination of these pre-formed without modifying or otherwise compromising functionality thereof.

Pre-formed microdevices may be connected to the platform structure to establish fluidic communication with the microfluidic flow path network via the access ports. The manner of connection may be by direct bonding of the microdevice to the platform structure, such as by oxidation bonding as discussed above. In this case, an enlarged docking cavity (not shown) may be molded into the platform structure to bond the microdevice therein so that fluidic communication is established with at least one access port. Alternatively, at least one of the access ports may be a docking port 34 enabling docking connection with pre-formed microdevices, such as the micropumps 41 and 42 in FIG. 5. The docking ports 34 are adapted to captively seat the microdevice therein. The use of PDMS for modeling the platform structure enables snug friction-fit seating and docking of external devices, due primarily to its elastomeric composition and properties. It is appreciated that the formation of the access ports and/or docking ports is carried out for connection with a particular type of microdevice. It is also notable that the microdevice(s) are preferably removably connected to the platform structure, such that the microdevice may be plugged into and out of a docking port. The elastomeric properties of the preferred PDMS composition of the platform structure enable captive seating of a microdevice, such as, for example the micropumps 41, 42 in FIG. 5. In this manner, worn, damaged or single-use microdevices may be easily replaced without discarding the platform structure and other microdevices also connected thereto.

Figure 8:
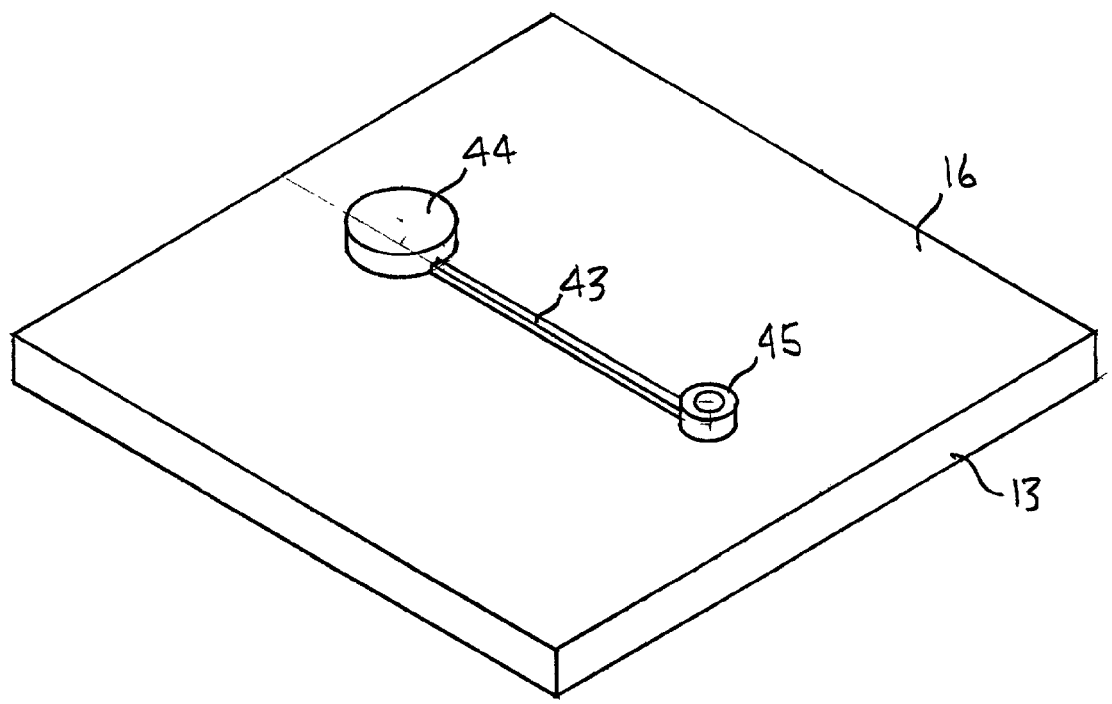
FIG. 8 is a perspective view of an exemplary base wall having micro-scale topographic features.
Figure 10:
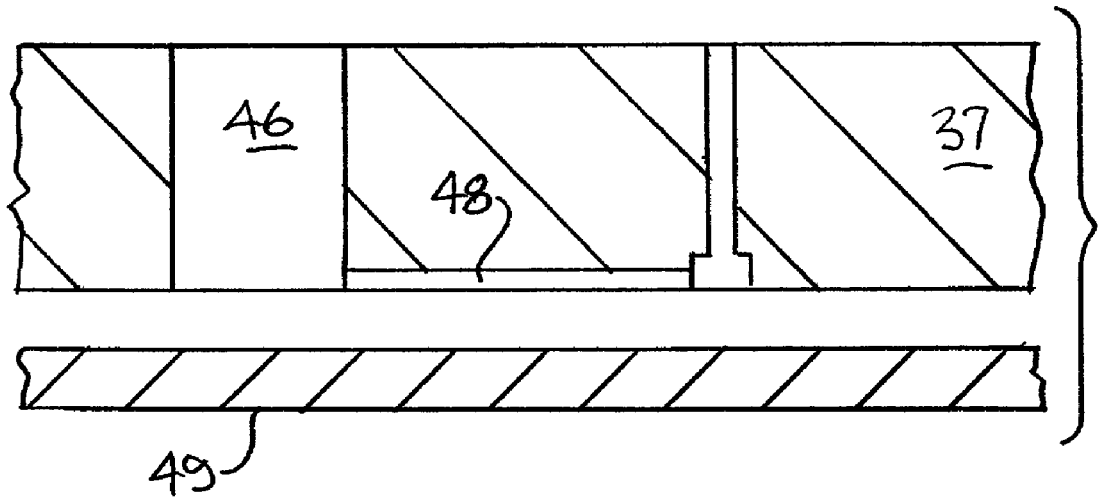
FIG. 10 is a cross-sectional view of a molded platform structure formed from the model construction of FIG. 9.
Figure 11:
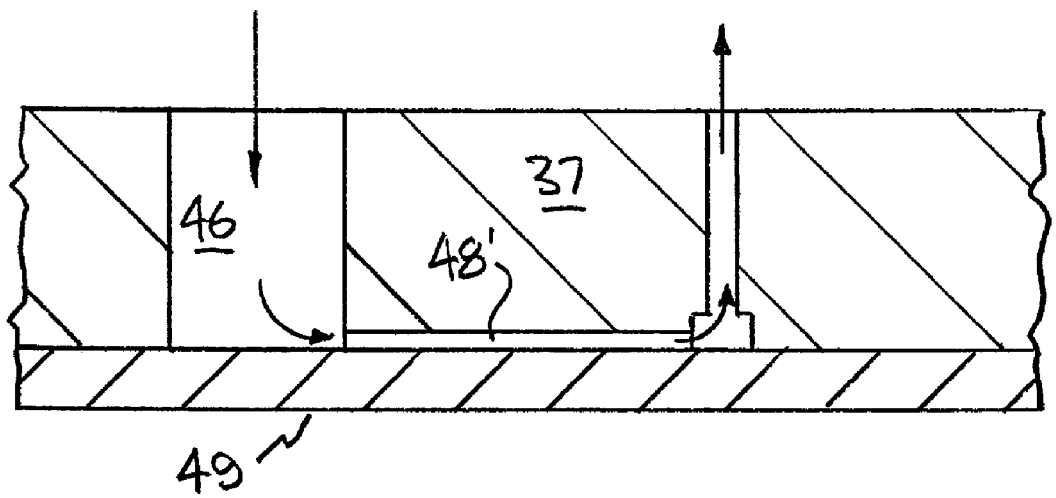
FIG. 11 is a cross-section view following FIG. 10 subsequent to the bonding of a substrate cover to enclose the micro-scale cavities and thereby form a micro-scale microfluidic flow path network.

In another embodiment of the present invention, the formed platform structure may comprise both meso-scale features and micro-scale features, with the meso-scale features interfacing macro and micro-scale mediums. As shown in FIG. 8, a base wall 13 has an inner surface 16 having micro-scale topographical features 43, 44, 45 formed thereon, typically by a conventional process such as by photolithography. The exemplary micro-scale topographic features shown in FIG. 8 include a positively-relieved microchannel mold form 43 having micro-scale dimensions, e.g. between about 1-100 microns width and height. The microchannel mold form 43 is shown integrally connected to a first raised surface 44 and a second raised surface 45. Preferably, the raised surfaces 44 and 45 have a footprint the same or similar to in area as a corresponding meso-scale mold form used in the construction of a meso-scale model construction. Meso-scale features are mold-formed into the platform structure by utilizing meso-scale mold forms selected from a set of meso-scale mold forms. Meso-scale mold forms provided in the set of interconnectable mold forms have larger dimensions than the micro-scale features, typically in the range of 1-10 mm diameters. As shown in FIG. 9, a meso-scale cylindrical block mold form 23 is placed in contact with the first raised surface 44 along a contact area 46. Additionally, a connector pin 50 having a threaded shank portion and a preferably smooth leading end portion is threadedly secured to the cover 12 of the mold frame and pressed against the second raised surface 45. As can be seen in FIG. 9, the connector pin 50 has a conical tip which is in flush mating contact with a conical cavity 47 formed on the second raised surface 45. The mating contact serves to produce sealed contact between the connector pin 50 and the second raised surface 45. Upon introducing PDMS or other molding liquid into the mold cavity 15 and hardening or otherwise solidifying the PDMS, a molded platform structure 37 is formed, shown in FIG. 10, having the meso-scale features, such as the reservoir 47, in fluidic communication with the formed microchannel 48 formed from the micro-scale microchannel mold form 43. As can be seen in FIG. 10, the microchannel 48 is formed along one surface of the resulting platform structure 37.

Various microfluidic platform structures formed according to the present invention may be formed for subsequent bonding with other platform structures to form larger microfluidic systems. Each platform structure may comprise a complete, self-contained system, or serve to accomplish a specific function of a larger fluidic system. In the case of specialized modules, alignment of the various platforms structures is required so as to establish fluidic communication between respective access ports. This may be accomplished using alignment features molded into the platforms using alignment mold forms provided in the set of mold forms. Such alignment mold forms are typically not used in conjunction with other selected mold forms for construction the model construction. Exemplary alignment features, e.g. cavities 36, are shown in FIG. 1, such that protrusions from a second platform structure (not shown) may be matably inserted therein in stacking combination.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. A method of forming a microfluidic system platform comprising the steps of:
   providing a mold frame having frame walls surrounding a mold cavity;
   providing a set of independent mold forms for use in molding hollow microfluidic features, the set of independent mold forms comprising elongated mold forms for use in molding microfluidic channels, and block mold forms for use in molding microfluidic cavities;
   constructing a three-dimensional model construction of a microfluidic flow path network in the mold cavity by interconnecting mold forms selected from the set of independent mold forms and suspending the model construction in the mold cavity via the frame walls;
   introducing a hardenable liquid into the mold cavity to immerse the model construction thereby;
   hardening the liquid to form (1) a platform structure having a shape of the mold cavity and (2) the microfluidic flow path network in the platform structure having a seamless shape of the model construction and including at least two access ports for enabling fluidic communication with the formed microfluidic flow path network; and
   removing the model construction from the platform structure through the at least two access ports so as to avail the formed microfluidic flow path network.

2. The method as in claim 1,
   wherein the hardenable liquid comprises a polymeric material.

3. The method as in claim 2,
   wherein the polymeric material comprises an elastomeric silicone polymer.

4. The method as in claim 3,
   wherein the silicone polymer comprises poly(dimethylsiloxane).

5. The method as in claim 1,
   wherein the set of mold forms available for selection further comprises interconnect mold forms for interconnecting at least two of the elongated mold forms to each other.

6. The method as in claim 5,
   wherein each of the interconnect mold forms have at least two connector ports in fluidic communication with each other, with each connector port adapted to seat an end portion of an elongated mold form therein.

7. The method as in claim 6,
   wherein the removal of the model construction from the platform structure removes all selected mold forms except interconnect mold forms which remain embedded, whereby the fluidic flow path network is defined in part by the embedded interconnect mold forms.

8. The method as in claim 1,
   wherein the construction of the model construction includes interconnecting a pre-formed microdevice to the model construction in the mold cavity so that, upon hardening the liquid and removing the model construction, the microdevice remains embedded in the platform structure as part of the microfluidic flow path network and in fluidic communication therewith.

9. The method as in claim 1,
   wherein the model construction of the microfluidic flow path network has meso-scale dimensions.

10. The method as in claim 9,
    wherein at least one of the frame walls has an inner surface having micro-scale topographical features facing the mold cavity, and
    further comprising placing the meso-scale model construction in contact with the micro-scale topographical features so that, upon hardening the liquid and removing the model construction, the meso-scale microfluidic flow path network is in fluidic communication with micro-scale open cavities formed on a molded outer surface of the platform structure, whereby the meso-scale microfluidic flow path network serves to interface macro and micro-scale mediums.

11. The method as in claim 10,
    further comprising bonding a substrate to the molded outer surface of the molded structure so as to enclose the micro-scale open cavities and thereby form a micro-scale microfluidic flow path network in fluidic communication with the meso-scale microfluidic flow path network.

12. The method as in claim 1,
    wherein at least one of the access ports is a meso-scale reservoir cavity for receiving fluidic samples and formed from a block mold form placed in surface-to-surface contact with a frame wall.

13. The method as in claim 1,
    wherein at least one of the access ports is a docking port adapted to captively seat a pre-formed microdevice so that fluidic communication may be established with the formed microfluidic flow path network.

14. A method of forming an integrated microfluidic system comprising the steps of:
    providing a mold frame having frame walls surrounding a mold cavity;
    providing a set of independent mold forms for use in molding hollow microfluidic features, the set of independent mold forms comprising elongated mold forms for use in molding microfluidic channels, and block mold forms for use in molding microfluidic cavities;

constructing a three-dimensional model construction of a microfluidic flow path network in the mold cavity by interconnecting mold forms selected from the set of independent mold forms and suspending the model construction in the mold cavity via the frame walls;

introducing a hardenable liquid into the mold cavity to immerse the model construction thereby;

hardening the liquid to form (1) a platform structure having a shape of the mold cavity and (2) the microfluidic flow path network in the platform structure having a seamless shape of the model construction and including at least two access ports for enabling fluidic communication with the formed microfluidic flow path network;

removing the model construction from the platform structure through the at least two access ports so as to avail the formed microfluidic flow path network; and connecting a pre-formed microdevice to the platform structure so that fluidic communication is established with the formed microfluidic flow path network via at least one of the at least two access ports of the platform structure.

15. The method as in claim 14,
wherein the hardenable liquid comprises a polymeric material.

16. The method as in claim 15,
wherein the polymeric material comprises an elastomeric silicone polymer.

17. The method as in claim 16,
wherein the silicone polymer comprises poly(dimethylsiloxane).

18. The method as in claim 14,
wherein the construction of the model construction includes interconnecting a pre-formed microdevice to the selected mold forms in the mold cavity so that, upon hardening the liquid and removing the model construction, the microdevice remains embedded in the platform structure as part of the microfluidic flow path network and in fluidic communication therewith.

19. The method as in claim 14,
wherein the model construction of the microfluidic flow path network has meso-scale dimensions.

20. The method as in claim 19,
wherein at least one of the frame walls has an inner surface having micro-scale topographical features facing the mold cavity, and
further comprising placing the meso-scale model construction in contact with the micro-scale topographical features so that, upon hardening the liquid and removing the model construction, the meso-scale microfluidic flow path network is in fluidic communication with micro-scale open cavities formed on a molded outer surface of the platform structure, whereby the meso-scale microfluidic flow path network serves to interface macro and micro-scale mediums.

21. The method as in claim 20,
further comprising bonding a substrate to the molded outer surface of the molded structure so as to enclose the micro-scale open cavities and thereby form a micro-scale microfluidic flow path network in fluidic communication with the meso-scale microfluidic flow path network.

22. The method as in claim 14,
wherein the connection between the pre-formed microfluidic device and the platform structure is effected by bonding the pre-formed microdevice to the platform structure.

23. The method as in claim 22,
wherein the pre-formed microdevice is bonded to the platform structure via oxidation bonding.

24. The method as in claim 14,
wherein at least one of the access ports is a docking port adapted to captively seat the pre-formed microdevice, and where the connection between the pre-formed microfluidic device and the platform structure comprises docking the pre-formed microdevice in the corresponding docking port of the platform structure to establish fluidic communication with the formed microfluidic flow path network.

25. The method as in claim 24,
wherein the pre-formed microdevice is releasably docked in the at least one docking port of the platform structure.

26. The method as in claim 14,
wherein at least one of the access ports is a meso-scale reservoir cavity for receiving fluidic samples and formed from a block mold form placed in surface-to-surface contact with a frame wall.

27. A method of forming a microfluidic system platform comprising the steps of:

providing a mold frame having frame walls surrounding a mold cavity, said frame walls having throughbores communicating with the mold cavity;

providing a set of mold forms for use in molding hollow microfluidic features, the set of mold forms comprising elongated mold forms for use in molding microfluidic channels, and block mold forms for use in molding microfluidic cavities;

constructing a three-dimensional model construction of a microfluidic flow path network in the mold cavity by interconnecting mold forms selected from the set of mold forms and suspending the model construction in the mold cavity via the frame walls by seating at least some of the selected mold forms in the throughbores;

introducing a hardenable liquid into the mold cavity to immerse the model construction thereby;

hardening the liquid to form (1) a platform structure having a shape of the mold cavity and (2) the microfluidic flow path network in the platform structure having a seamless shape of the model construction and including at least two access ports for enabling fluidic communication with the formed microfluidic flow path network; and removing the model construction from the platform structure through the at least two access ports so as to avail the formed microfluidic flow path network.

28. The method as in claim 27,
wherein the removal of the model construction from the platform structure includes removing at least some of the selected mold forms through the throughbores.

29. The method as in claim 27,
further comprising connecting a pre-formed microdevice to the platform structure so that fluidic communication is established with the formed microfluidic flow path network via at least one of the at least two access ports of the platform structure.

30. The method as in claim 29,
wherein the removal of the model construction from the platform structure includes removing at least some of the selected mold forms through the throughbores.

31. The method as in claim 30,
wherein the set of mold forms available for selection further comprises interconnect mold forms for interconnecting at least two of the elongated mold forms to each other.

32. The method as in claim 31,
wherein each of the interconnect mold forms have at least two connector ports in fluidic communication with each other, with each connector port adapted to seat an end portion of an elongated mold form therein.

33. The method as in claim 32,
wherein the removal of the model construction from the platform structure removes all selected mold forms except interconnect mold forms which remain embedded, whereby the fluidic flow path network is defined in part by the embedded interconnect mold forms.

\* \* \* \* \*